United States Patent
Cook

[11] Patent Number: 5,975,816
[45] Date of Patent: Nov. 2, 1999

[54] HARMONIC DAMPENER FOR ROTARY TOOL HOLDER

[76] Inventor: Harold D. Cook, 33642 Via Martos, Dana Point, Calif. 92629

[21] Appl. No.: 08/890,221

[22] Filed: Jul. 9, 1997

[51] Int. Cl.⁶ ...................................................... B23C 9/00
[52] U.S. Cl. ............................ 409/131; 29/447; 279/158; 408/143; 409/141
[58] Field of Search .................................. 279/103, 158; 408/143, 239 A, 239 R; 409/141, 234, 231, 232, 233, 131, 132; 29/447

[56] References Cited

U.S. PATENT DOCUMENTS

| | | |
|---|---|---|
| 1,285,589 | 11/1918 | Barnes . |
| 1,404,016 | 1/1922 | Engelbrekt . |
| 1,409,753 | 3/1922 | Moore . |
| 1,539,413 | 5/1925 | Fish . |
| 1,658,504 | 2/1928 | Weiss . |
| 1,936,498 | 11/1933 | Corbett ........................................ 76/108 |
| 1,994,792 | 3/1935 | Sanderson ................................. 255/63 |
| 2,125,005 | 7/1938 | Jearum ....................................... 29/96 |
| 2,161,062 | 6/1939 | Killgore ................................... 262/33 |
| 2,374,919 | 5/1945 | Bruseth ..................................... 90/11 |
| 2,729,458 | 1/1956 | Sacrey ....................................... 279/41 |
| 2,860,547 | 11/1958 | Stephan ..................................... 90/11 |
| 2,893,291 | 7/1959 | Hollis ........................................ 90/11 |
| 2,913,935 | 11/1959 | Flannerty et al. .......................... 77/58 |
| 2,918,290 | 12/1959 | Werstein .................................... 279/19 |
| 2,920,913 | 1/1960 | Antila ....................................... 287/119 |
| 2,942,891 | 6/1960 | Zale .......................................... 279/1 |
| 3,053,118 | 9/1962 | Lavallee . |
| 3,221,404 | 12/1965 | Averill et al. ............................. 29/568 |
| 3,307,243 | 3/1967 | Andreasson ............................... 29/106 |
| 3,372,951 | 3/1968 | McCash ..................................... 287/91 |
| 3,397,615 | 8/1968 | Meinke ...................................... 90/11 |
| 3,424,055 | 1/1969 | Rollat ........................................ 90/11 |
| 3,463,048 | 8/1969 | Owsen ...................................... 408/143 |
| 3,557,419 | 1/1971 | Flannery ................................... 29/105 |
| 3,643,546 | 2/1972 | Richter et al. ........................... 409/141 |
| 3,725,994 | 4/1973 | Wechsler ................................... 29/447 |
| 3,807,804 | 4/1974 | Kniff ......................................... 299/91 |
| 3,937,587 | 2/1976 | Lindem et al. ........................... 408/181 |
| 3,945,753 | 3/1976 | Bennett .................................... 408/146 |

(List continued on next page.)

FOREIGN PATENT DOCUMENTS

| | | | |
|---|---|---|---|
| 0026751 | 11/1981 | European Pat. Off. .............. 279/11 S |
| 382079B1 | 8/1993 | European Pat. Off. . | |
| 662704 | 6/1938 | Germany . | |
| 1008546 | 5/1957 | Germany ............................... 279/158 |
| 1238311 | 4/1967 | Germany ............................... 408/143 |
| 2229374 | 1/1974 | Germany ............................... 279/1 A |
| 2759007 | 8/1978 | Germany ........................... 408/239 A |
| 2811977 | 9/1979 | Germany . | |
| 3701602 | 8/1988 | Germany ............................... 409/232 |
| 3925641C2 | 9/1992 | Germany . | |
| 5316976 | 2/1978 | Japan ..................................... 279/1 A |
| 57-107710 | 5/1982 | Japan ..................................... 279/9.1 |
| 663493 | 5/1979 | U.S.S.R. ................................ 408/143 |
| 1493389 | 7/1989 | U.S.S.R. ................................ 408/143 |
| 425539 | 4/1935 | United Kingdom ................... 408/143 |
| 551065 | 2/1942 | United Kingdom . | |
| 729295 | 5/1955 | United Kingdom ....................... 279/8 |
| 921522 | 3/1963 | United Kingdom .................. 340/279 |
| 1319200 | 6/1973 | United Kingdom . | |
| 2137124 | 10/1984 | United Kingdom ....................... 279/7 |

OTHER PUBLICATIONS

Mi–Tech Metals, Inc., "High Density Tungsten Based Metals" 4 pages.

*Primary Examiner*—Daniel W. Howell
*Assistant Examiner*—Christopher Kirkman

[57] ABSTRACT

A tool holder for use in a rotating spindle of a milling machine. The tool holder comprises a conically tapered shank portion for insertion into the spindle and a cutting tool mounting portion. Disposed between the shank and mounting portions is a flange portion. Additionally, extending about the shank portion is a dampening member. The dampening member is compressible between the flange portion and the spindle when the tool holder is inserted into the spindle, and is adapted to eliminate harmonic resonance attributable to the use of the tool holder with an extended shank cutting tool.

18 Claims, 1 Drawing Sheet

U.S. PATENT DOCUMENTS

| | | | |
|---|---|---|---|
| 3,989,260 | 11/1976 | Zonkov et al. | 279/4 |
| 3,734,515 | 5/1973 | Dudek | 279/1 A |
| 3,994,615 | 11/1976 | Narang | 408/226 |
| 4,021,051 | 5/1977 | Toyomoto et al. | 279/1 N |
| 4,099,889 | 7/1978 | Vig | 408/239 R |
| 4,133,545 | 1/1979 | Komori | 279/83 |
| 4,226,562 | 10/1980 | Schmid et al. | 409/233 |
| 4,251,113 | 2/1981 | Mitin et al. | 299/69 |
| 4,274,774 | 6/1981 | Haga et al. | 409/232 |
| 4,298,208 | 11/1981 | Benjamin et al. | 409/234 |
| 4,305,203 | 12/1981 | Bock et al. | 29/800 |
| 4,377,292 | 3/1983 | Staron | 409/234 |
| 4,436,463 | 3/1984 | Rea | 409/234 |
| 4,453,775 | 6/1984 | Clemmow | 299/81 |
| 4,560,289 | 12/1985 | Wood, III | 384/99 |
| 4,619,564 | 10/1986 | Jacobson | 408/146 |
| 4,642,005 | 2/1987 | Kondo et al. | 409/234 |
| 4,668,138 | 5/1987 | Carter | 409/234 |
| 4,795,292 | 1/1989 | Dye | 409/136 |
| 4,808,049 | 2/1989 | Cook | 409/234 |
| 4,818,161 | 4/1989 | Cook | 409/236 |
| 4,934,743 | 6/1990 | Kapgan et al. | 285/23 |
| 4,971,491 | 11/1990 | Cook | 409/131 |
| 4,993,894 | 2/1991 | Fischer et al. | 409/143 |
| 5,048,375 | 9/1991 | Kobayashi | 76/108 |
| 5,150,639 | 9/1992 | Hill | 76/108.2 |
| 5,277,435 | 1/1994 | Kramer et al. | 2779/9.1 |
| 5,280,671 | 1/1994 | Marquart . | |
| 5,311,654 | 5/1994 | Cook | 29/447 |
| 5,352,074 | 10/1994 | Ishikawa | 409/232 |
| 5,582,494 | 12/1996 | Cook | 409/234 |
| 5,593,258 | 1/1997 | Matsumoto et al. | 279/103 |
| 5,775,857 | 7/1998 | Johne | 409/234 |
| 5,797,605 | 8/1998 | Gross et al. | 279/4.05 |

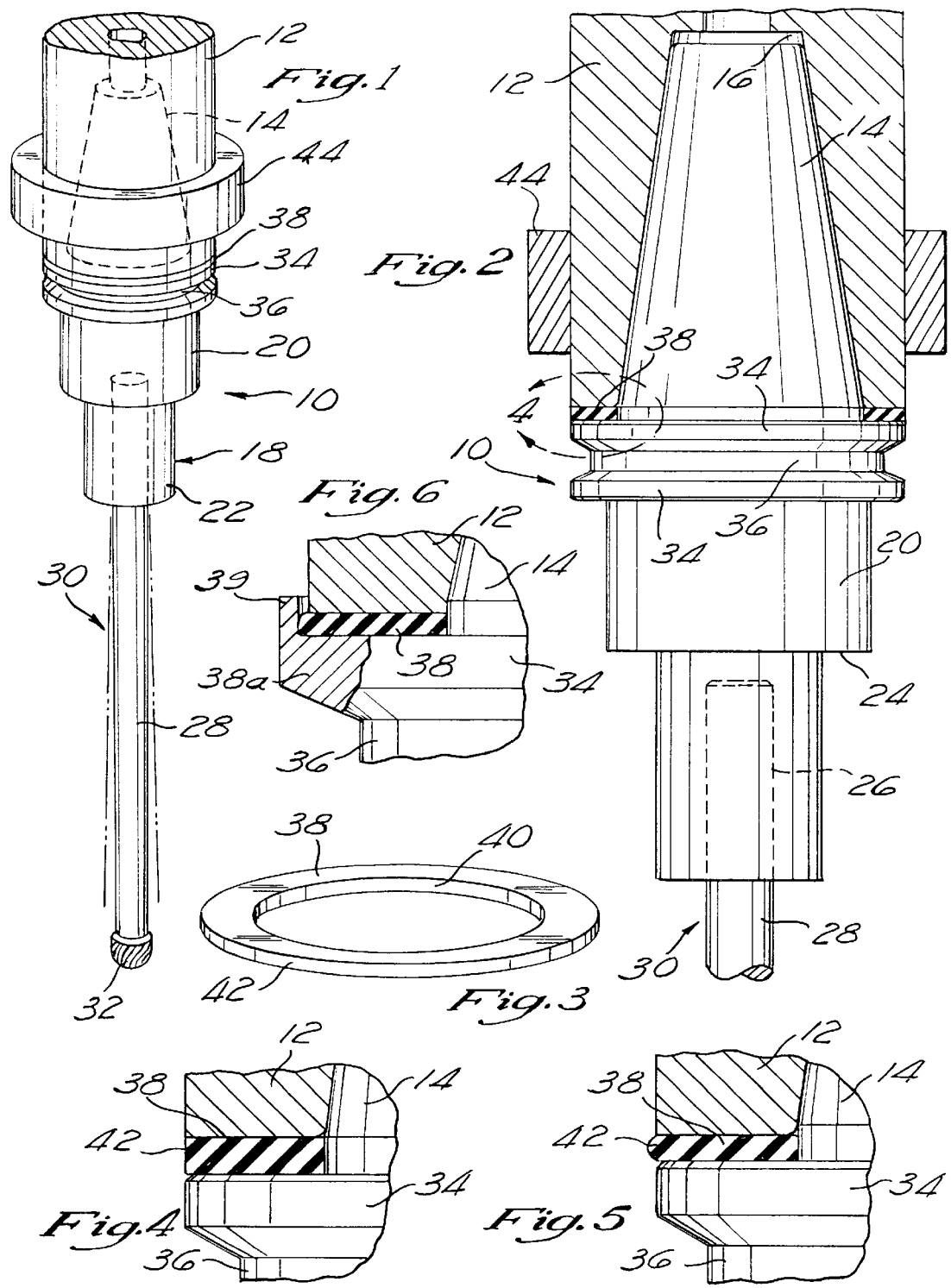

HARMONIC DAMPENER FOR ROTARY TOOL HOLDER

FIELD OF THE INVENTION

The present invention relates generally to machine tools, and more particularly to a tool holder including an elastomeric harmonic dampener for eliminating the harmonic resonance which typically occurs when long reach, extended shank cutting tools are used in high speed milling applications.

BACKGROUND OF THE INVENTION

As is well known, various tool holders have been utilized in the prior art which interface with a rotating spindle of a machine such as a milling or boring machine to securely hold a cutting tool upon the machine during the cutting of a work piece. In most prior art tool holders, a central aperture is formed therein for receiving the shank portion of the cutting tool which is to be interfaced to the milling or other machine. Subsequent to the insertion of the shank portion of the cutting tool into the central aperture, the tool holder is drawn or pulled tightly into the spindle so as to rigidly maintain the cutting tool within the tool holder.

Though interfacing the cutting tool to the machine, the prior art tool holders possess certain deficiencies which detract from their overall utility. In particular, when the elongate, extended shank of a long reach cutting tool is inserted into and secured within the central aperture of the tool holder, there is a tendency for a harmonic resonance to be generated through the cutting tool and into the tool holder, particularly when the cutting tool is used in a high speed milling application. The transfer of the harmonic resonance into the tool holder gives rise to slight movements thereof relative to the spindle, and in extreme cases results in the tool holder loosening within the spindle. As will be recognized, the resonance of the tool holder relative to the spindle results in the cut in the work piece being substantially out of tolerance.

A further deficiency with the prior art tool holders is that the manner in which the shank portion of the cutting tool is secured within the central aperture of the tool holder often results in the non-concentric mounting of the cutting tool within the tool holder. Such non-concentric mounting is unacceptable in modern, high tolerance machining applications such as those performed on a vertical milling machine wherein minor variations in the concentricity of the cutting tool within the tool holder often times causes catastrophic failure in the cutting operation.

The present invention addresses the deficiencies of prior art tool holders by providing a tool holder which includes a dampening member for eliminating the harmonic resonance which typically occurs when long reach, extended shank cutting tools are used in high speed milling applications. In the tool holder constructed in accordance with the present invention, the non-concentric mounting of the shank portion of the cutting tool within the tool holder is also substantially eliminated by the heat shrinking the shank portion of the cutting tool within the tool holder.

SUMMARY OF THE INVENTION

In accordance with the present invention, there is provided a tool holder for use in the rotating spindle of a milling machine. The tool holder comprises a conically tapered shank portion which is adapted to be inserted into a complementary recess within the spindle. In addition to the shank portion, the tool holder includes a cylindrically configured cutting tool mounting portion which includes an aperture extending axially therein for receiving the shank of a cutting tool. Formed between the shank and mounting portions is a circularly configured flange portion which extends radially outward relative to the shank and mounting portions. Disposed within the peripheral edge of the flange portion is a generally V-shaped slot or recess which is adapted to accommodate an automated tool holder changer. The tool holder is typically fabricated from tool steel such as H13 or A2 tool steel, or alloy steel such as 4340 alloy steel.

The tool holder of the present invention further comprises an annular, ring-like dampening member which is disposed upon the upper surface of the flange portion and extends about (i.e., surrounds) the shank portion. The dampening member is preferably fabricated from an elastomeric material, and is compressible between the flange portion and the spindle when the shank portion of the tool holder is inserted into and secured within the spindle. When compressed in the aforementioned manner, the dampening member is adapted to eliminate harmonic resonance which would normally otherwise occur when the elongate, extended shank of a long reach cutting tool is inserted into the aperture of the cutting tool mounting portion of the tool holder and the cutting tool is used in a high speed milling application. The dampening member also creates a seal between the flange portion of the tool holder and the spindle which prevents debris, cutting oil, or other contaminants from getting between the shank portion of the tool holder and recess of the spindle, thus maintaining the cleanliness of the spindle/tool holder combination. The tool holder may also be provided with a retaining lip which is formed on and extends about the flange portion, and circumvents the dampening member when the same is disposed upon the upper surface of the flange portion. The retaining lip is used to prevent the excessive radial displacement of the dampening member from between the spindle and the flange portion when the tool holder is used in extremely high speed milling applications.

The tool holder constructed in accordance with the present invention is preferably used in combination with an annular compression ring which is extensible about the spindle of the milling machine. When secured to (i.e., compressed about) the spindle, the compression ring assists in maintaining the shank portion of the tool holder firmly seated within the spindle by ensuring a proper fit between the conical taper of the shank portion and the complementary recess within the spindle. In this respect, the compression ring prevents the corresponding tapered surfaces from opening up and loosening the tool holder within the spindle. The compression ring is preferably fabricated from a composite material, and is adapted to be secured to the spindle via a shrink fitting technique/process.

Further in accordance with the present invention, there is provided a method of mounting a tool holder having a conically tapered shank portion, a cutting tool mounting portion, and a flange portion disposed between the shank and mounting portions into a rotating spindle of a milling machine. The method comprises the initial step of providing the tool holder with a dampening member which extends about the shank portion of the tool holder. Thereafter, the shank portion of the tool holder is inserted into the spindle such that the dampening member contacts both the flange portion and the spindle. The tool holder is then secured within the spindle such that the dampening member is compressed between the flange portion and the spindle. The preferred method further comprises the steps of heat shrinking a compression ring about the spindle for assisting in maintaining the shank portion of the tool holder firmly seated therewithin, and heat shrinking the shank portion of a cutting tool within the cutting tool mounting portion of the tool holder.

BRIEF DESCRIPTION OF THE DRAWINGS

These, as well as other features of the present invention, will become more apparent upon reference to the drawings wherein:

FIG. 1 is a perspective view of the tool holder of the present invention as inserted into the rotating spindle of a milling machine;

FIG. 2 is a front elevational view of the tool holder as inserted into the rotating spindle of the milling machine, illustrating the spindle, a dampening member of the tool holder, and a compression ring used in conjunction with the tool holder in cross-section;

FIG. 3 is a perspective view of the dampening member of the tool holder of the present invention;

FIG. 4 is an enlarged view of the encircled region 4 in FIG. 2, illustrating the dampening member of the tool holder in an uncompressed state;

FIG. 5 is an enlarged view similar to FIG. 4 illustrating the dampening member of the tool holder in a compressed state; and FIG. 6 is an enlarged view similar to FIG. 5 illustrating an alternative embodiment of the tool holder which includes a retaining lip for preventing the excessive radial displacement of the dampening member.

DETAILED DESCRIPTION OF THE PREFERRED EMBODIMENT

Referring now to the drawings wherein the showings are for purposes of illustrating a preferred embodiment of the preset invention only, and not for purposes of limiting the same, FIG. 1 perspectively illustrates a tool holder 10 which is adapted for use in the rotating spindle 12 of a machine such as a milling machine or a boring machine. The tool holder 10 comprises a conically tapered shank portion 14 which is adapted to be inserted into a complementary recess 16 within the spindle 12. In this respect, the slope of the inner surface of the recess 16 corresponds to the slope of the outer surface of the shank portion 14, with the shank portion 14 being firmly seated within the recess 16 when the tool holder 10 is properly secured to the spindle 12. Typically, the tool holder 10 is secured to the spindle 12 by drawing the shank portion 14 upwardly into the recess 16. Additionally, the tool holder 10 is typically fabricated from tool steel such as H13 or A2 tool steel, or alloy steel such as 4340 alloy steel.

In addition to the shank portion 14, the tool holder 10 of the present invention comprises a cutting tool mounting portion 18 which includes a cylindrically configured upper section 20 and a cylindrically configured lower section 22. The lower section 22 extends axially from the upper section 20 and has an outer diameter which is less than that of the upper section 20 such that an annular shoulder 24 is defined between the upper and lower sections 20, 22. Extending axially within the lower section 22 of the mounting portion 18 is a central aperture 26 which is adapted to receive the shank 28 of a cutting tool 30. As will be discussed in more detail below, the tool holder 10 of the preset invention is particularly suited for use with a "long reach" cutting tool having an elongate, extended shank. As seen in FIG. 1, the cutting tool 30 is of the "long reach" variety, with the shank 28 thereof being of substantial length and the cutting head 32 of the cutting tool 30 being separated from the mounting portion 18, and in particular the lower section 22 thereof, by a substantial distance. However, those of ordinary skill in the art will recognize that the tool holder 10 of the present invention may also be used in conjunction with cutting tools having shanks of substantially lesser length. Though not shown, it will be recognized that the mounting portion 18 of the tool holder 10 may be of uniform diameter rather than including the differently sized upper and lower sections 20, 22.

In addition to the shank and mounting portions 14, 18, the tool holder 10 comprises a circularly configured flange portion 34 which is formed between the shank portion 14 and the upper section 20 of the mounting portion 18. The flange portion 34 extends radially outward relative to the shank portion 14 and upper section 20, and includes a generally V-shaped slot 36 disposed within the peripheral edge thereof and extending circumferentially thereabout. The slot 36 is adapted to accommodate a tool holder changer (not shown) to carry and contact the tool holder 10 for automatic removal and insertion of the tool holder 10 from and into the spindle 12. Those skilled in the art will recognize that the tool holder 10 of the preset invention bears general similarity to standard tool holder dimensional configurations such as the American Standard, Japanese B.T., European B.N., and Caterpillar V-Flange Standard.

Referring now to FIGS. 2–5, the tool holder 10 of the present invention further comprises an annular, ring-like dampening member 38 which is disposed upon the upper surface of the flange portion 34 and extends about (i.e., surrounds) the base of the shank portion 14. As best seen in FIGS. 2 and 4, the dampening member 38 is sized such that when positioned in the aforementioned manner, the inner edge 40 thereof either contacts or is disposed in extremely close proximity to the base of the shank portion 14 and the outer edge 42 thereof is substantially flush with the peripheral edge of the flange portion 34. The dampening member 38 is preferably fabricated from a compressible material, and more particularly an elastomeric material.

As best seen in FIGS. 2, 4 and 5, with the dampening member 38 being operatively positioned upon the upper surface of the flange portion 34, the shank portion 14 of the tool holder 10 is inserted into the recess 16 of the spindle 12 such that the dampening member 38 contacts both the flange portion 34 and the spindle 12 (FIG. 4). When the shank portion 14 is drawn or pulled into the recess 16 for purposes of rigidly securing the tool holder 10 to the spindle 12, the dampening member 38, due to its fabrication from an elastomeric material, is compressed between the flange portion 34 and spindle 12, thus causing its outer edge 42 to bulge outwardly relative to the peripheral edge of the flange portion 34 and the outer surface of the spindle 12 (FIG. 5).

As previously indicated, the tool holder 10 of the present invention is particularly suited for use in conjunction with a long reach cutting tool, such as the cutting tool 30 shown in FIG. 1. When the long reach cutting tool 30 is used in a high speed milling application, there is a tendency for a harmonic resonance to be generated by the shank 28 and transferred into the tool holder 10. Advantageously, the dampening member 38, when compressed in the manner shown in FIG. 5, effectively dampens and thus substantially eliminates the harmonic resonance transferred into the tool holder 10 by the cutting tool 30. The dampening of such harmonic resonance prevents slight movements of the cutting tool 30 relative to the tool holder 10 which could cause cuts made by the cutting head 32 to be substantially out of tolerance or, in extreme cases, could result in the loosening of the tool holder 10 within the spindle 12.

In addition to dampening harmonic resonance in the aforementioned manner, the dampening member 38, when compressed in the manner shown in FIG. 5, creates a seal between the flange portion 34 of the cutting tool 10 and the spindle 12. When prior art tool holders are inserted into the spindles of milling machines, a gap is typically defined between the upper surface of the flange portion and the spindle. The dampening member 38 effectively eliminates such gap by filling the same, with the seal created thereby preventing debris, cutting oil, or other contaminants from getting between the outer surface of the shank portion 14 and the inner surface of the recess 16, thus maintaining the cleanliness of the combined tool holder 10 and spindle 12.

Referring now to FIGS. 1 and 2, the tool holder 10 of the present invention is preferably used in combination with an annular compression ring 44 which is extensible about the outer surface of the spindle 12. When secured to (i.e., compressed about) the spindle 12, the compression ring 44 assists in maintaining the shank portion 14 of the tool holder 10 firmly seated within the recess 16 of the spindle 12 by ensuring a proper fit between the complementary tapers of the outer surface of the shank portion 14 and the inner surface of the recess 16. In this respect, the compression ring 14 prevents these corresponding tapered surface from opening up and loosening the tool holder 10 within the spindle 12. The compression ring 44 is preferably fabricated from a composite material. Additionally, in the preferred embodiment, the compression ring 44 is secured to the spindle 12 via a shrink fitting process. In this respect, the inner diameter of the compression ring 44 is sized to normally be slightly smaller than the outer diameter of the spindle 12. The cooling of the spindle 12 facilitates the thermal contraction thereof from a first outer diameter to a reduced second outer diameter. The compression ring 44 is then advanced over the reduced diameter spindle 12. The spindle 12 is then allowed to return to ambient temperature to facilitate the thermal expansion thereof from its reduced second outer diameter back to its first outer diameter. The return of the spindle 12 to its original outer diameter results in the compression of the compression ring 44 about the outer surface thereof.

In addition to the compression ring 44 preferably being secured to the spindle 12 via a shrink fitting process, the shank 28 of the cutting tool 30 is preferably secured within the central aperture 26 of the lower section 22 of the mounting portion 18 via a heat shrinking process. In this respect, the central aperture 26 is sized having a diameter which is slightly less than the diameter of the shank 28. The application of heat to the lower section 22 via a heat source such as an induction heater effectively increases the diameter of the central aperture 26, thus allowing the shank 28 to be slidably inserted thereinto to a desired axial position. When the external application of heat via the induction heater is discontinued and the lower section 22 of the mounting portion 18 allowed to cool back to ambient temperature, thermal contraction causes the central aperture 26 to form a rigid interface, i.e., a metal-to-metal press fit, between the lower section 22 of the mounting portion 18 and the shank 28 of the cutting tool 30. As such, the heat shrinking process rigidly maintains the cutting tool 30 within the tool holder 10 in a concentric fashion for high tolerance machining applications. In this respect, the use of the heat shrinking process prevents the non-concentric mounting of the cutting tool 30 within the tool holder 10 in view of the uniform engagement between the inner surface of the lower section 22 defining the central aperture 26 and the outer surface of the shank 28 of the cutting tool 30.

The tool holder 10 of the present invention is preferably used by initially inserting the shank portion 14 into the recess 16 in the aforementioned manner such that the dampening member 38 contacts both the flange portion 34 and spindle 12. Thereafter, the tool holder 10 is secured within the spindle 12 such that the dampening member 38 is compressed between the flange portion 34 and the spindle 12. The compression ring 44 is then secured to the spindle 12 in the aforementioned manner for assisting in maintaining the shank portion 14 firmly seated within the recess 16. Finally, the shank 28 of the cutting tool 30 is heat shrunk within the lower section 22 of the mounting portion 18 to facilitate the concentric attachment of the cutting tool 30 to the tool holder 10. Those of ordinary skill in the art will recognize that the cutting tool 30 may be attached to the tool holder 10 prior to the tool holder 10 being secured within the spindle 12.

Referring now to FIG. 6, the tool holder 10 of the present invention may alternatively be configured to include a flange portion 38a having an integral retaining lip 39 extending upwardly from the upper surface thereof. The retaining lip 39 is integrally connected to and extends about the periphery of the flange portion 38a. When advanced over the shank portion 14 and placed upon the upper surface of the flange portion 38a, the dampening member 38 is oriented within, i.e., surrounded by, the retaining lip 39. Advantageously, when the tool holder 10 is used in extremely high speed milling applications (e.g., approximately 40,000 rpm's) the retaining lip 39 prevents excessive radial displacement of the compressed dampening member 38 from between the spindle 12 and the flange portion 38a. In this respect, any excessive "creep" of the dampening member 38 radially outwardly due to the extremely high rotational speeds of the spindle 12 is prevented by the abutment of the peripheral edge of the dampening member 38 against the inner surface of the retaining lip 39.

Additional modifications and improvements of the present invention may also be apparent to those of ordinary skilled in the art. Thus, the particular combination of parts described and illustrated herein is intended to represent only one embodiment of the present invention, and is not intended to serve as limitations of alternative devices within the spirit and scope of the invention.

What is claimed is:

1. A tool holder for use in a rotating spindle of a milling machine, said tool holder comprising:

a conically tapered shank portion for insertion into the spindle;

a cutting tool mounting portion;

a flange portion disposed between the shank and mounting portions; and a dampening member extending about the shank portion; said dampening member being compressible between the flange portion and the spindle to extend laterally beyond flange and spindle borders upon compression when the tool holder is inserted into the spindle to thereby eliminate harmonic resonance attributable to the use of the tool holder with an extended shank cutting tool.

2. The tool holder of claim 1 wherein said dampening member is fabricated from an elastomeric material.

3. The tool holder of claim 1 further in combination with a compression ring extensible about the spindle for assisting in maintaining the shank portion of the tool holder firmly seated therewithin.

4. The tool holder of claim 3 wherein the compression ring is secured to the spindle via a shrink fitting process.

5. The tool holder of claim 3 wherein the compression ring is fabricated from a composite material.

6. In a tool holder having a conically tapered shank portion for insertion into a rotating spindle of a milling machine, a cutting tool mounting portion, and a flange portion disposed between the shank and mounting portions, the improvement comprising a dampener member which is compressible between the flange portion and the spindle to extend laterally beyond flange and spindle borders upon compression when the tool holder is inserted thereinto to thereby eliminate harmonic resonance attributable to the use of the tool holder with an extended shank cutting tool.

7. The tool holder of claim 6 wherein the dampening member is fabricated from an elastomeric material.

8. The tool holder of claim 6 further in combination with a compression ring extensible about the spindle for assisting in maintaining the shank portion of the tool holder firmly seated therewithin.

9. The tool holder of claim 8 wherein the compression ring is secured to the spindle via a shrink fitting process.

10. The tool holder of claim 8 wherein the compression ring is fabricated from a composite material.

11. A method of mounting a tool holder having a conically tapered shank portion, a cutting tool mounting portion, and a flange portion disposed between the shank and mounting portions into a rotating spindle of a milling machine, comprising the steps of:
   (a) providing the tool holder with a dampening member which extends about the shank portion of the tool holder and which extends laterally upon compression;
   (b) inserting the shank portion of the tool holder into the spindle such that the dampening member contacts both the flange portion and the spindle; and
   (c) securing the tool holder within the spindle such that the dampening member is compressed between the flange portion and the spindle to extend laterally beyond flange and spindle borders upon such compression.

12. The method of claim 11 further comprising the step of:
   (d) securing a compression ring about the spindle for assisting in maintaining the shank portion of the tool holder firmly seated therewithin.

13. The method of claim 12 wherein step (d) comprises:
   (1) cooling the spindle to facilitate the thermal contraction thereof from a first size to a reduced second size;
   (2) advancing the compression ring over the spindle; and
   (3) allowing the spindle to return to ambient temperature to facilitate the thermal expansion thereof from the second size back to the first size;
   (4) the return of the spindle to the first size resulting in the compression of the compression ring thereabout.

14. The method of claim 12 further comprising the step of:
   (e) securing a shank portion of a cutting tool within the cutting tool mounting portion of the tool holder.

15. The method of claim 14 wherein step (e) comprises heat shrinking the shank portion of the cutting tool within the cutting tool mounting portion of the tool holder.

16. A tool holder for use in a rotating spindle of a milling machine, said tool holder comprising:
   a conically tapered shank portion for insertion into the spindle;
   a cutting tool mounting portion;
   a dampening member extending about the shank portion; and
   a flange portion disposed between the shank and mounting portions and having a retaining lip formed thereon which surrounds the dampening member upon insertion of the tool holder into the spindle;
   said dampening member being compressible between the flange portion and the spindle when the tool holder is inserted into the spindle to thereby eliminate harmonic resonance attributable to the use of the tool holder with an extended shank cutting tool.

17. In a tool holder having a conically tapered shank portion for insertion into a rotating spindle of a milling machine, a cutting tool mounting portion, and a flange portion disposed between the shank and mounting portions, the improvement comprising a dampener member which is compressible between the flange portion and the spindle when the tool holder is inserted thereinto and wherein said flange member has a retaining lip formed thereon which surrounds the dampening member, whereby said dampening member eliminates harmonic resonance attributable to the use of the tool holder with an extended shank cutting tool.

18. A method of mounting a tool holder having a conically tapered shank portion, a cutting tool mounting portion, and a flange portion disposed between the shank and mounting portions into a rotating spindle of a milling machine, comprising the steps of:
   (a) providing the tool holder with a dampening member which extends about the shank portion of the tool holder;
   (b) providing a flange portion having a retaining lip formed on and extending there about;
   (c) inserting the shank portion of the tool holder into the spindle such that the dampening member contacts both the flange portion and the spindle; and
   (d) securing the tool holder within the spindle such that the dampening member is oriented within the retaining lip and compressed between the flange portion and the spindle.

\* \* \* \* \*